US010530782B2

United States Patent
Brockhuus et al.

(10) Patent No.: US 10,530,782 B2
(45) Date of Patent: Jan. 7, 2020

(54) METHOD FOR IDENTIFYING UNAUTHORIZED ACCESS OF AN ACCOUNT OF AN ONLINE SERVICE

(71) Applicant: Palmaso ApS, Copenhagen K (DK)

(72) Inventors: Ole Brockhuus, Copenhagen K (DK); Annesophia Yttesen, Copenhagen K (DK)

(73) Assignee: PALMASO APS, Copenhagen K (DK)

( * ) Notice: Subject to any disclaimer, the term of this patent is extended or adjusted under 35 U.S.C. 154(b) by 159 days.

(21) Appl. No.: 15/570,606

(22) PCT Filed: May 2, 2016

(86) PCT No.: PCT/EP2016/059759
§ 371 (c)(1),
(2) Date: Oct. 30, 2017

(87) PCT Pub. No.: WO2016/174261
PCT Pub. Date: Nov. 3, 2016

(65) Prior Publication Data
US 2018/0288066 A1    Oct. 4, 2018

(30) Foreign Application Priority Data

Apr. 30, 2015    (EP) .................................... 15165988

(51) Int. Cl.
*H04L 29/06* (2006.01)
*H04W 4/029* (2018.01)
(Continued)

(52) U.S. Cl.
CPC ............ *H04L 63/107* (2013.01); *H04L 63/08* (2013.01); *H04L 67/306* (2013.01); *H04W 4/029* (2018.02); *H04W 12/08* (2013.01)

(58) Field of Classification Search
CPC ..... H04W 12/00502; H04W 12/00503; H04W 12/08; H04L 63/107; H04L 63/08; H04L 63/1408; H04L 67/306
(Continued)

(56) References Cited

U.S. PATENT DOCUMENTS

| 6,687,504 | B1 * | 2/2004 | Raith | ...................... | H04W 8/08 |
| | | | | | 455/404.2 |
| 7,360,248 | B1 * | 4/2008 | Kanevsky | ............... | G06F 21/31 |
| | | | | | 726/21 |

(Continued)

FOREIGN PATENT DOCUMENTS

WO    20120075323 A1    6/2012

OTHER PUBLICATIONS

Shi, Elaine, et al. "Implicit authentication through learning user behavior." International Conference on Information Security. Springer, Berlin, Heidelberg, 2010. (Year: 2010).*

(Continued)

*Primary Examiner* — Syed A Zaidi
(74) *Attorney, Agent, or Firm* — Dinsmore & Shohl LLP

(57) ABSTRACT

The present disclosure relates to a method for identifying unauthorized access of an account of an online service, such as an email or a social network service, wherein the account is associated with a legitimate user, the method comprising the steps of: retrieving login information from recent login activity of the account corresponding to a geographic location associated with the ongoing or most recent login attempt; retrieving usage information comprising a geographic location of a legitimate user from a device of the legitimate user; comparing the login information and the usage information by comparing the geographic location associated with the ongoing or most recent login attempt and
(Continued)

the geographic location of a legitimate user; and identifying potentially unauthorized login(s) by an unauthorized user.

20 Claims, 2 Drawing Sheets

(51) Int. Cl.
 *H04W 12/08* (2009.01)
 *H04L 29/08* (2006.01)
(58) Field of Classification Search
 USPC .............................................................. 726/7
 See application file for complete search history.

(56) References Cited

U.S. PATENT DOCUMENTS

| | | | | |
|---|---|---|---|---|
| 8,370,389 | B1* | 2/2013 | Dotan | G06F 21/43 |
| | | | | 707/781 |
| 9,042,919 | B2* | 5/2015 | Trussel | H04L 63/0807 |
| | | | | 455/457 |
| 9,177,125 | B2* | 11/2015 | Steeves | G06F 21/31 |
| 2003/0112182 | A1* | 6/2003 | Bajikar | G06F 21/30 |
| | | | | 342/457 |
| 2005/0187934 | A1 | 8/2005 | Motsinger et al. | |
| 2006/0098795 | A1* | 5/2006 | Choti | H04L 63/10 |
| | | | | 379/114.14 |
| 2006/0106944 | A1* | 5/2006 | Shahine | G06Q 20/382 |
| | | | | 709/245 |
| 2009/0094164 | A1* | 4/2009 | Fontaine | G06Q 20/3674 |
| | | | | 705/67 |
| 2009/0100260 | A1* | 4/2009 | Govindarajan | H04L 9/0872 |
| | | | | 713/155 |
| 2010/0175116 | A1* | 7/2010 | Gum | G06F 21/31 |
| | | | | 726/6 |
| 2010/0268818 | A1 | 10/2010 | Richmond et al. | |
| 2011/0013569 | A1* | 1/2011 | Scherzer | H04W 48/14 |
| | | | | 370/329 |
| 2013/0254857 | A1* | 9/2013 | Bajenov | G06F 21/00 |
| | | | | 726/7 |
| 2014/0380475 | A1 | 12/2014 | Canning et al. | |
| 2015/0127527 | A1* | 5/2015 | Eide | G06Q 20/227 |
| | | | | 705/39 |
| 2015/0135021 | A1* | 5/2015 | Robison | G06F 21/6263 |
| | | | | 714/55 |
| 2015/0373020 | A1* | 12/2015 | Hale | H04L 63/0861 |
| | | | | 713/170 |
| 2016/0073261 | A1* | 3/2016 | Hughes, Jr. | H04L 63/105 |
| | | | | 455/411 |
| 2016/0285888 | A1* | 9/2016 | Arunkumar | H04L 63/107 |

OTHER PUBLICATIONS

IPRP dated Oct. 4, 2017 in corresponding PCT application No. PCT/EP2016/059759.
ISR/WO dated Jul. 19, 2016 in corresponding PCT application No. PCT/EP2016/059759.
Ghogare et al., Location Based Authentication: A New Approach towards Providing Security, International Journal of Scientific and Research Publications, Apr. 2012, vol. 2, Issue 4, Pune, India.

* cited by examiner

Recent activity:

| Access Type [?]<br>(Browser, mobile, POP3, etc.) | Location (IP address) [?] | Date/Time<br>(Displayed in your time zone) |
|---|---|---|
| Browser | * Denmark (130.185.135.74) | 08:54 (0 minutes ago) |
| Browser | Sweden (2.69.109.81) | 21 Apr (2 days ago) |
| Browser | Sweden (2.69.109.81) | 21 Apr (2 days ago) |
| Mobile | Sweden (83.191.238.210) | 17 Apr (6 days ago) |
| Mobile | Sweden (83.191.238.210) | 16 Apr (7 days ago) |
| Mobile | Sweden (83.191.238.210) | 16 Apr (7 days ago) |
| Mobile | Sweden (79.138.132.100) | 16 Apr (7 days ago) |
| Browser | Denmark (130.185.135.74) | 16 Apr |
| Browser | Sweden (37.250.211.101) | 28 Mar |

Alert preference: Show an alert for unusual activity. Change

* indicates activity from the current session.

This computer is using IP address 130.185.135.74. (Denmark)

FIG. 1

METHOD FOR IDENTIFYING UNAUTHORIZED ACCESS OF AN ACCOUNT OF AN ONLINE SERVICE

The present disclosure relates to a computer implemented method and a system for identifying unauthorized access of an account of an online service. The account is associated with a legitimate user and the method involves retrieving recent login activity, retrieving usage information from the legitimate user, comparing and evaluating the login information and usage information.

BACKGROUND OF INVENTION

Online services, such as web-based email services and social network services, have rapidly gained popularity worldwide during the past decades. It is not uncommon for a person to have a number of accounts for a number of purposes. Following the increased use of such systems there is consequently also increased illegal activity relating to hacking and/or compromising the accounts. Security for these online services can in some cases be considered to be relatively low—typically only a password is needed to access the services and once the service has been compromised it may be possible both to cause damage to the legitimate user and sometimes lock the legitimate user out, for example by changing password.

Some of the online service providers provide information about recent login, containing information about for example when the login occurred, which browser that was used, from which IP the login was performed and from which country. These data have different names, for example "recent login activity" or "last account activity" and are typically available to the user. Users are encouraged to read the list and evaluate whether they think there are inappropriate accesses.

Some of the online service providers also send alerts for suspicious activity if there is a login which does not seem to match previous other recent logins in the recent login activity. However, in many cases the alerts are false, and in other cases real intrusions are not detected. One reason for failing to identify the real intrusions and/or generating false alerts is that is difficult for the service providers to evaluate whether a change in the behavior in the login activity originates from the user voluntarily changing behavior, for example by travelling or logging in from a different device.

A further issue with the processing of recent login activity to identify suspicious activity is that if the intrusion originates from a person close to the legitimate user, for example a family member, friend or colleague, it may be impossible to distinguish these access from accesses by the legitimate user, in particular if the person uses a device belonging to the legitimate user.

SUMMARY OF INVENTION

The present disclosure relates to a computer implemented method for identifying unauthorized access of an account of an online service, such as an email or a social network service, wherein the account is associated with a legitimate user, the method comprising the steps of: retrieving login information from recent login activity of the account; retrieving usage information from a device of the legitimate user; comparing the login information and the usage information; identifying potentially unauthorized login(s) by an unauthorized user. By retrieving usage information from a device of the legitimate user the method is capable of taking into account specific behavior and patterns associated with the legitimate user. Compared to analyzing only the recent login activity, the method presents considerable advantages in that for example real-time details about the user can be included or details only controlled by the legitimate user. The latter is relevant provided that the user does not want to give away certain types of information to the online services. Preferably the recent login activity corresponds to an ongoing login attempt or the most recent login attempt. In particular the retrieved login information may correspond to a geographic location associated with the ongoing or most recent login attempt. The retrieved usage information preferably also comprises a geographic location of the legitimate user, wherein the geographic location comes from a device of the legitimate user. By comparing the geographic location associated with the ongoing or most recent login attempt and the geographic location of the device of the legitimate user, an efficient geographic authentication is achieved. By comparing the legitimate user's actual position from a device, such as the user's primary device, and a position that is provided when accessing the service, an efficient authentication is achieved. The present method makes use of the fact that in this context it is known which device(s) that define the actual location of the legitimate user.

The method may be seen as a device centred approach. In contrast to the known solutions, the presently disclosed method makes use of the actual location of a device of a legitimate user. In one embodiment the information about the geographic location of the legitimate user is retrieved from a primary device of the legitimate user. The intention is that when a potentially authorized user accesses the service, it will be requested to provide a geographical location either manually or by means of an extraction of for example location by GPS, an IP address or other applications or networks in order to verify its location. The legitimate user may define a primary device, such as a mobile phone, for this purpose. The primary device may provide the actual location of the legitimate user.

The retrieved usage information can be illustrated as a user fingerprint. As mentioned the fingerprint provides improved capabilities to check for e.g. real-time parameters of the user, and can generally be said to bring the advantage that the information retrieved from the device of the legitimate user is not limited information associated only with specific logins but can be continuously logged data and basically any type of logged data that provides relevant information about a use pattern. The retrieved usage information from a device of the legitimate user may comprise for example information about an access type (PC browser/mobile browser/smartphone or tablet application/POP3/IMAP), a browser(s), an operating system, IP addresses.

The retrieved usage information from a device of the legitimate user may also comprise geographical locations. A major advantage of geographical data is that geographical data can be very efficient to distinguish unauthorized access from valid logins. There are several advantages of using geographical locations and there are several ways to do it. The geographic location of the legitimate user may be provided by a global positioning system of the device (possibly assisted GPS (A-GPS)), by a Wi-Fi system of the device, or by cell positioning or cell triangulation. Comparing this data against the recent login activity gives more accurate results than merely going through the IP addresses of the recent login activity, and, as stated above, in combination with real-time checks and continuous, or partly continuous, logging the fingerprint of the legitimate user.

Other parameters, such as the mobile network or the network operator may also provide useful information for the comparison.

A further aspect of the invention relates to improved capabilities to identify suspicious activity originating from a person close to the legitimate user. By combining elements from usage information retrieved from the device the legitimate user can have a record of safe combinations, e.g. reading emails from a certain location at a certain time interval during the day or using a specific browser or accessing from a specific mobile network. If an access is different from the safe combinations, it could indicate that a person close to legitimate user, e.g. a friend, family member or colleague, has come across the password and is trying to access the online service in the name of the legitimate user.

DESCRIPTION OF DRAWINGS

FIG. 1 shows an example of recent login activity from a web-based email account.

DEFINITIONS

Figure 2:
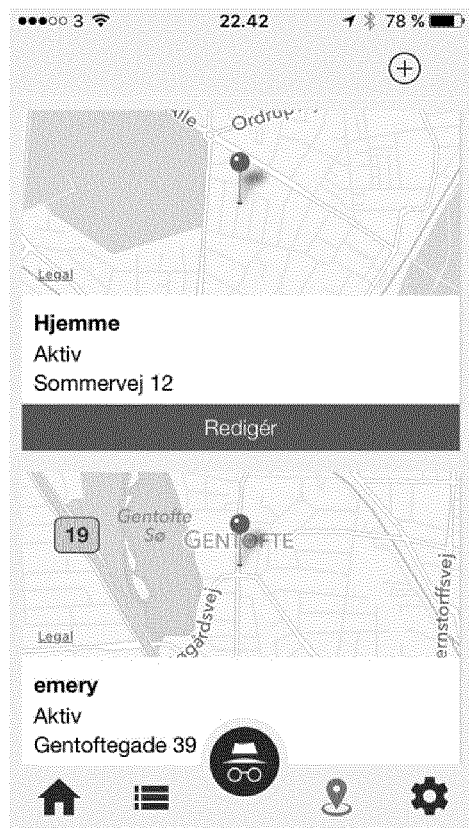
FIG. 2 shows examples of safe locations in an application.

Online service: refers to any type of web-based service, such as email, social networks and communities (sports, academics etc.), banking, administration, different types of communication (voice, video, chat), payment services, web shops, services for managing e.g. bills and consumption (e.g. phone and electricity), television and video streaming services etc. for which a login is required.

Legitimate user: the person that has the right to log in to an account of an online service, typically the person that has created the account or for which the account was created. If more than one person share an account, the legitimate user should be understood as all persons sharing the account.

Unauthorized user: any person or device which has not been appointed by the legitimate user as authorized to log in to the account.

Potentially authorized user: the term can be said to refer a person or device attempting to access the account before it has been determined whether the user is considered to be the legitimate user or an unauthorized user. The user is at this point neither confirmed authorized or unauthorized, hence potentially authorized.

Device: should be construed broadly not only as the physical device of the legitimate user but also including e.g. remote servers, clouds or web-based content management systems. It should be noted that it is the device of the legitimate user i.e. a server of the online service is not included.

Primary device: in the present disclosure the primary device is referred to as device of a legitimate user, which is a reference device in terms of the usage information, typically a geographic location, that is checked against. A primary device may be for example a mobile phone, a tablet computer, a laptop computer, a smartwatch, a wearable device etc.

Usage information: refers to the data of the legitimate user and covers a broad range of data, including but not limited to, access type (PC browser/mobile browser/smartphone or tablet application/POP3/IMAP), and/or web browser, operating system, IP address, geographical location and time indications.

Recent login activity: refers to a number of logins or login attempts associated with a specific account of an online service. Other terms, such as "last account activity", are also used among online service providers with the same meaning. Recent login activity may refer to one single login and may also be an ongoing login or login attempt. Thus the presently disclosed method may relate to a method for identifying unauthorized access of an ongoing login attempt.

Login information from recent login activity: the data associated with login or login attempts to the account of an online service. This information covers a broad range of data, including but not limited to, access type (PC browser/mobile browser/smartphone or tablet application/POP3/IMAP), browser, operating system, IP address, geographic location (country/city/geographic coordinates), date and time. The data is sometimes available to the legitimate user of the account. Typically the data is not continuously logged data—each set of data is instead associated with a login or login attempt.

DETAILED DESCRIPTION OF THE INVENTION

The present disclosure relates to a method for identifying unauthorized access of an account of an online service, such as an email or a social network service, wherein the account is associated with a legitimate user, the method comprising the steps of: retrieving login information from recent login activity of the account corresponding to a geographic location associated with the ongoing or most recent login attempt; retrieving usage information comprising a geographic location of a legitimate user from a device of the legitimate user; comparing the login information and the usage information by comparing the geographic location associated with the ongoing or most recent login attempt and the geographic location of a legitimate user; and identifying potentially unauthorized login(s) by an unauthorized user. By retrieving usage information from a device of the legitimate user the method is capable of taking into account specific behavior and patterns associated with the legitimate user. Compared to analyzing only the recent login activity, the method presents considerable advantages in that for example real-time details about the user can be included or details only controlled by the legitimate user. In particular a geographic location of a legitimate user from a device of the legitimate user may be an efficient tool for geographic authentication of online services. Details only controlled by the legitimate user are relevant provided that the user does not want to give away certain types of information to the online services. The method can be implemented in many ways, notably as an application for smartphones or as software running on a PC or similar.

In one scenario a user that logs on to an online service is requested to provide a geographic location either manually or by means of an extraction of a process or application on his device. This provided location may then be compared to the location of the legitimate user (the service account owner). The location of the legitimate user may be the actual location of the legitimate user's primary device, where the legitimate user has appointed his primary device. If the potentially authorized user, i.e. the person trying to log is not at the same location as the primary device of the legitimate user, an unauthorized access is identified.

The method can be performed as part of a login verification, but can also be performed for previous login attempts. In one embodiment the legitimate user is requested to confirm the geographical location of the device for one or more login attempts.

The usage patterns can also be shared across several online services used by the same user. In one embodiment authorized and/or unauthorized logins are shared between at least two different accounts of online services associated with a legitimate user. For example the method may base the comparison on the fact that a user typically accesses different services in one order. If the order is different than the order of reference, the method may identify a potentially unauthorized access.

Recent Login Activity Information

As defined above recent login activity in the presently disclosed invention refers to a number of logins or login attempts associated with a specific account of an online service. This information may comprise the last n number of login and/or login attempts where n is any integer equal to or above 1, such as 1, or 2, or 3, or 4, or 5, or 6, or 7, or 8, or 9, or 10, or 20, or 30, or 40, or 50, or 100, or 200, or 500, or 1000 or any interval of these numbers, such as 1 to 10, 1 to 50, 1 to 100, or 1 to 1000 or greater than 1000. An ongoing login attempt is also considered to be within the scope of the recent login activity. This means that a login attempt by a potentially unauthorized user may be stopped if the provided login information does not match the usage information of the legitimate user.

FIG. 1 shows an example of recent login activity from a web-based email account. In this example each login is associated with a date/time stamp, information about the access type (browser/mobile/POP3 etc.) and a location. The location is typically extracted from the IP address from which the login was performed. IP addresses are sometimes allocated in blocks to network operators. If these block allocations are known, a given specific IP address may therefore be associated to an operator network.

In one embodiment of the presently disclosed invention the step of retrieving login information from recent login activity comprises: gathering information about (an) access type(s) (PC browser/mobile browser/smartphone or tablet application/POP3/IMAP), and/or (a) browser(s), and/or (an) operating system(s), and/or (an) IP address(es), and/or (a) geographic location(s) (country/city/geographic coordinates), and/or date, and/or time for each of the logins and/or login attempts. The limitation of the content of the recent login activity can be said to depend on what the provider chooses to include but also what kind of information the user accepts to give away. Generally, any device connected to an online service is associated with an IP address, which means that in principle there is always, directly or indirectly, some kind of minimum geographical information available to the service provider, which may be supplemented by other geographical information. The step of retrieving an autonomous system number (ASN) and/or map an IP to a network, area code or physical location is based on well-known techniques available to the skilled person.

As stated the login information of a recent login activity of the account is the type of information that is often provided directly in a session of the online service. However, the recent login activity according to the present invention does not necessarily have to be retrieved directly from the session, but could also be retrieved from logged information directly in the device. Alternatively information about the use of an application associated with the online service is retrieved from the device. If the user is not able to, or does not want to, connect to the service for any reason, the recent login activity can be based on stored logins or login attempts on the device or information about the use of an application associated with the online service. If an application or program has been active during a period of time without the permission of the legitimate user, e.g. while the legitimate user was away, the use of the application or program associated with the online service may serve as an indication of unauthorized access. The usefulness of such a feature can be illustrated by the following example. If the legitimate user leaves his device at home and leaves the home, a friend or family member could use the device to log on to the online service without the permission of the legitimate user. This login information is stored in the device. In one embodiment of the invention the recent login activity of the account is retrieved from the device of the legitimate user. This information can then be used in the step of comparing the login information and the usage information to identify the unauthorized access. Also in this regard, and as stated in the definitions, 'device' is to be construed broadly not only as the physical device of the legitimate user but also including e.g. remote servers, clouds or web-based content management systems.

An ongoing login attempt is also considered to be within the scope of the recent login activity. In one embodiment the most recent login attempt is a single most recent login attempt. The geographic location may be provided manually by a potentially authorized user as part of a login attempt. Alternatively the geographic location may be provided by an application associated with the online service, such as a tracking script for an email or online service. One issue in relation to the implementation of the method for third party online services may be that all usage information is not provided by the service provider, for example geographical locations. One way of handling this situation for e.g. an email service is to include tracking scrips in emails checking for the user's position by means of e.g. geolocation, network, IP addresses or other methods giving data about the location of the device reading the mail. In one embodiment the geographic location is extracted from an activity of the potentially authorized user. Connection between a certain activity and a geographic location may also be useful in this regard. Furthermore, the fact that a potentially authorized user is requested to provide a geographic location but does not provide a geographic location may also be taken into account to evaluate whether an access is unauthorized. In one embodiment the user is requested to provide the geographic location corresponding to the ongoing or single most recent login attempt. A negative response (i.e. a response that does not match the geographic location of a legitimate user from a device of the legitimate user) or an absence of a response within a predefined period of time corresponds to the ongoing or single most recent login attempt being considered an unauthorized login. In response to an unauthorized login the method may further comprise the step of rejecting the ongoing login attempt if the ongoing login attempt is identified as an unauthorized login.

Usage Information

Retrieving usage information from a device of the legitimate user according to the presently disclosed method includes information that has been stored on the device for a period of time, either at certain time intervals, at specific points in time or continuously over a period of time. The period of time may be a predefined period of time, such as 1 day, or 1 week, or 1 month, or 2 months, or 6 months, or 1 year back in time. The retrieved information may comprise information about (an) access type(s) (PC browser/mobile browser/smartphone or tablet application/POP3/IMAP), and/or (a) browser(s), and/or (an) operating system(s), and/ or (an) IP address(es) corresponding to legitimate accesses of the legitimate user. In contrast to the recent login information of the online service, there is not really a limitation of the type of usage information that can be included.

Since this information one by one may not be sufficient to find a reliable pattern of the user, the present invention further relates to creating information systematically stored in groups. As an example the retrieved usage information may be stored such that for a specific time or event there is information about which browser, operating system, IP address the legitimate user was using at the specific point in time. The groups can be said to constitute the fingerprint of the legitimate user. As stated this brings the benefit that the information about the legitimate user is not limited to specific logins but can be continuously logged data and basically any type of logged data that provides relevant information about a use pattern One advantage of the presently disclosed invention over the methods commonly used by the providers to alert for suspicious activity is that the usage information from a device of the legitimate user may comprise information about a geographic location of the legitimate user, which may be both more precise and accurate than the information that is in the recent login activity information, and linked to events or points in time other than the logins that were made, including continuously logged geographical data. There are several ways of retrieving said geographical data from the device of the legitimate user. One way is to collect data from a global positioning system (GPS) of the device, or from a Wi-Fi connection of the device. Advanced GPS is a further option. A-GPS is typically used to improve the startup performance of the GPS or provide location details when the device does not have connection to GPS satellites. Cellular positioning and cell triangulation are further options to provide geographical data. Typically less accurate, nevertheless relevant if the user for example prefers not to activate the GPS, is retrieving an IP address corresponding to a numerical label of the device in a computer network. The IP address could be any type of IP address, for example IPv4 or IPv6. IP addresses are sometimes presented along with information about the mobile network, including e.g. the name of the provider or the name of the mobile network. This information may be extracted by the presently disclosed method to be used in the step of comparing the login information and the usage information. The domain name may be determined by reverse Domain Name System (DNS) lookup or reverse DNS resolution, which determines the domain name associated with a given IP address. IP addresses are sometimes allocated in blocks to network operators. If these block allocations are known, a given specific IP address may therefore be associated with an operator network. This information can also be used as a record of usage information of the legitimate user. Other information that may be included are a mobile country code (MCC), and/or mobile network code (MNC), and/or location are code (LAC), and/or cell ID of a mobile network.

In one embodiment the presently disclosed method makes use of the actual location of a device of a legitimate user. A primary device may be appointed by the legitimate user which provides usage information from a device of the legitimate use. In one embodiment the information about the geographic location of the legitimate user is retrieved from a primary device of the legitimate user. The geographic location may correspond to an actual location of the legitimate user provided by the primary device of the legitimate user and the primary device may be defined by the legitimate user. Therefore the step of comparing the login information and the usage information may also comprise the step of comparing the geographic location corresponding to the ongoing or single most recent login attempt and the geographic location of the legitimate user. This comparison can be seen as a geographic authentication.

Comparing the Login Information and the Usage Information, and Identifying Unauthorized Logins The step of comparing the login information and the usage information, and identifying potentially unauthorized login by an unauthorized user may be carried out by a number of different approaches. One embodiment of the present disclosure therefore relates to comparing the geographical location of the login information and the geographical information of the usage information. This can be particularly useful if the geographical information of the usage information is substantially real-time information. If the legitimate user has activated the GPS of the device and a login occurs that does not match the present location of the user, it may serve as an indication that an unauthorized user has logged on to the account. In this context, the user may also have the possibility to manage what he considers to constitute safe locations. In one embodiment of the invention, the user may choose one or several locations from which he considers accesses to be authorized. The user may decide so either because he knows that it is a private physical location, which only the user can access, or if he trusts other persons residing in the location. If the user does not prefer to manage the list of safe locations manually, an automatic process can update the list of safe location with all the location the user has visited during a predefined period of time.

FIG. 2 shows examples of safe locations in an application. Safe locations are locations defined by the legitimate user. Safe locations, alternatively use locations, shall not necessarily be interpreted as safe, but as a location where the user for example lives, works or stays for an amount of time. By defining the safe locations the usage information can be fixed to the specific safe location. This provides a method for revealing unauthorized use that is similar to the legitimate user would use the service but otherwise difficult to identify as an unidentified login. If the legitimate user's primary device is not at the safe location and e.g. an IP address associated to a safe location is authorized using the standard criteria for identifying an unauthorized access, an unauthorized access may be identified based on the fact that the primary device is not at the safe location. An example of this kind of behaviour could be a spouse or colleague using a legitimate user's secondary device or using the login to the online service. By tying specific usage information to a safe/use location, unauthorized usage can be exposed if the legitimate user is not at the safe location where the specific usage information happens.

Figure 3:
FIG. 3 shows an example of an unauthorized login of an account at a location different from the location of the device in an application.

FIG. 3 shows an example of an unauthorized login of an account at a location different from the location of the device in an application. The example shows that there is or has been an access to a certain account at one location while the legitimate user (with an association to a specific device) was at a different location.

One of the advantages of the presently disclosed method is that it is more accurate in analyzing locations than a method based on only the recent login activity. If for example the GPS of the device is used to provide the information to be compared, the location can be determined within a few meters. Depending on the preference of the user, a suitable range for comparing the difference in distance between a geographical location from the login information and a geographical location from the usage information can be set up. In one embodiment of the present invention, the method identifies a potentially unauthorized login if the difference in distance between a geographical location from the login information and a geographical location from the usage information is greater than a predefined distance, such as preferably greater than 5 m, more preferably greater than 3 m, even more preferably greater than 1 m, or greater than 10 m, or greater than 15 m, or greater than 20 m, or greater than 30 m, or greater than 40 m, or greater than 50 m, or greater than 100 m, or greater than 200 m, or greater than 300 m, or greater than 400 m, or greater than 500 m, or greater than 1 km, or greater than 2 km, or greater than 3 km, or greater than 4 km, or greater than 5 km, or greater than 10 km, or greater than 100 km, or greater than 1000 km. Alternatively the method could map any given location to a specific region, such as a country. Therefore, in one embodiment of the invention the method identifies a potentially unauthorized login if a country of the login information, such as the last registered country, is different from the present geographical information of the usage information, wherein the present geographical information of the usage information comprises a country.

As stated above, in one embodiment of the invention a safe list is associated with the legitimate user. One possibility to use the list of safe locations is to compare the distance between a geographical location of a performed login listed in the recent login activity and all geographical location in the safe list. If the geographical location of the performed login listed in the recent login activity is greater than a predefined distance for all of the geographical locations of the safe list the method may flag the login as a potentially unauthorized login The method may also compare the access type(s), and/or the browser(s), and/or the operating system(s), and/or the IP address(es), and/or the network operator(s) of the login information with the access type(s), and/or the browser(s), and/or the operating system(s), and/or the IP address(es), and/or the network operator(s) of the usage information against information in the recent login activity. If the usage information comprises a number of records comprising legitimate access types, and/or browsers, and/or operating systems, and/or IP addresses, the method may identify a potentially unauthorized login if the browser of a recent login activity is different from the browser of all of the records comprising legitimate browsers, or if the access type of a recent login activity is different from the access type of all of the records comprising legitimate access types, or if the operating system of a recent login activity is different from the operating system of all of the records comprising legitimate operating systems, or if the IP address of a recent login activity is different from the IP address of all of the records comprising legitimate IP addresses. In this way the legitimate user may approve several access types/browsers/operating systems/IP addresses/network operators and as soon as an access does not correspond to any of the access types/browsers/operating systems/IP addresses/network operators the method may flag for an unauthorized access.

A further aspect of the present invention relates to a method for distinguishing unauthorized accesses originating from persons that are close to the legitimate user either in the sense that they are located nearby geographically or that they may have access to e.g. a device belonging to the legitimate user. In the presently disclosed invention the previously mentioned fingerprint of the legitimate user may comprise a combination of information corresponding to the normal behaviour of the user. Therefore, the method may identify a potentially unauthorized login if a combination of the geographical locations of the recent login activity and/or information about (an) access type(s) (PC browser/mobile browser/smartphone or tablet application/POP3/IMAP), and/or (a) browser(s), and/or (an) operating system(s), and/or (an) IP address(es) is different from a corresponding combination in an element of a safe combination list. The consequence of applying this method is that the legitimate user may be associated with normal and expected combinations, such as accessing an online service from one location using a specific mobile network. Certain combinations may be valid, for example accessing the online service from one geographical location but using any of two Internet browsers that are approved. However, in combination with a different mobile operator the access could originate from a person that is not intended to have access to the account, and therefore the method could identify this specific combination as a possible unauthorized login.

Valid and invalid combinations may also include time intervals. If a user for example knows that he is only present at certain locations at certain time intervals, for example at work during day time, going to work in the morning, or in his home during night time, the method can take into account these combinations and flag for an unauthorized login if the combination is not covered by a combination which has approved by the legitimate user. As an example a location corresponding to the residence of the legitimate user may be combined with a time interval corresponding to all hours except between 8 AM to 5 PM, during which the legitimate user is at work. An access from home during that period of time may indicate that a family member has accessed the online service from a device at home without the permission of the legitimate user.

Even advanced methods for identifying unauthorized accesses of online services will generate false alerts and fail to detect real unauthorized accessed occasionally. Therefore, one aspect of the present invention relates to indicating how credible an evaluation is. In order to provide the user with such information, the method may further comprise the step of generating a threat score based on the comparison of the login information and the usage information. The threat score may be calculated in several ways. In one embodiment the threat score is calculated based on previously registered evaluation; for example it may be known that certain combinations are not as efficient as others in identifying unauthorized logins. Certain comparisons may also be quantified, for example comparison of geographical distances. If a comparison based on a comparison of the geographical locations fails, the threat score could for example be proportionate to the distance. An access in a country far away from the user may be considered to be a more reliable indication of an unauthorized access than an access just outside the area that is considered safe in the comparison, and therefore the failing distance can be used as a parameter for the threat score.

In a further embodiment the presently disclosed method further comprises the step of associating an unauthorized access to a category of intruders based on the comparison. A number of categories may be established, comprising groups of potential intruders such as hackers, colleagues and family members. When the login information and the usage information is compared according to the method of the present invention, a number of different criteria may be used to identify an unauthorized access. The different criteria may be associated with different categories of intruders. For example, if the geographical location fails by a long distance, the unauthorized access can be categorized as a potential hacker attack, and if the access is from the residence of the legitimate user while he is at work, the unauthorized access can be categorized as originating from a family member.

Post Comparison and Identification

Once an unauthorized access has been identified the presently disclosed method may generate a visual, audible and/or tangible alert. The alert can e.g. be delivered to the legitimate user as a sound, tangible alert (e.g. vibration) and/or a pop-up window on the device, and/or as a notification in a mobile application and/or a computer program, and/or as an email, and/or as an SMS, and/or the alert is forward to another device, such as another mobile device, such as a mobile phone, a smart watch or a wearable device. One example of an alert is in the case where the method runs in a mobile application (app) on a device. If the method according to the present invention is executed in the application and an unauthorized access is identified, the same application may then generate an indication to the user comprising for example information about the location, type of device, browser etc. associated with the unauthorized access. However, it can be noted that the alert does not necessarily have to be sent to the device from which the usage data has been retrieved. The alert can also be sent to another device or e.g. email or SMS. The device that receives the alert could also forward the alert to a secondary device, for example a watch or wearable device.

A further aspect of the present invention relates to allowing the user to make his own evaluation of an identified unauthorized login. If the user recognizes the access as his own access or if he for other reasons considers the access to be authorized he may have the option to communicate this back to the application executing the method. The user can approve or reject the identified unauthorized login. This information may be linked to the information referred to in the present disclosure as safe list (e.g. list of safe locations) or safe combination list. Therefore, one embodiment of the method further comprises the step of adding the approved identified unauthorized login to the safe list or the records comprising legitimate access types, and/or browsers, and/or operating systems, and/or IP addresses.

In addition, the method may also take further action upon the identification of an unauthorized login. If the legitimate user evaluates and rejects an identified unauthorized login—reject defined as considering the identification to be correct—the method may log off the device from the online service. Alternatively, if several devices are logged in to the account at the same time, the method may comprise the step of logging off all devices and/or all sessions. This can be done either based on information available in the online service, or by the method keeping track of active sessions, or by a function in the online service including such an action, which would be known by the skilled person.

Other actions upon the identification of an unauthorized login are also possible. Since one unauthorized access of the account means that there could be others following, one embodiment of the method relates to suspending the account temporarily and/or changing the password and/or changing recovery data and/or updating security settings for the account for the account. If the legitimate user suspects that other accounts could also become subject to intrusion, the method could also suspend and/or change password and/or changing recovery data and/or updating security settings for the account for these accounts.

In one embodiment the method further comprises the step of retrieving alerts and/or warnings from the account of the online service. In some cases it may be of interest to use the accounts own alerts and/or warning for unauthorized access to supplement the checks, and/or compare the results. In another embodiment the presently disclosed method further comprises the step of retrieving the security setting of the online service account before or after the method is executed. One way of using this embodiment would be if the method is implemented in e.g. a mobile application. When the application is started, the method retrieves the security settings of one or several of the associated accounts and evaluates whether they are in line with the settings of the application (i.e. the disclosed method). If there are several accounts associated to the legitimate user, the method may comprise the further step of evaluating the consistency of the security settings between accounts associated to the legitimate user and/or evaluating a change in the security settings in relation to a prior login. Retrieving the security settings and other information from online service accounts can generallt considered to be known to those skilled in the art.

Besides generating alerts and/or warnings the presently disclosed method may also counteract identified unauthorized accesses in other ways. One embodiment of the method further comprises the step of revealing information, such as an IP address, geographical location, computer platform or other data, of the unauthorized user. A honeypot or a honeymail may be used for this purpose. This can be done automatically or manually by the legitimate user for instance by inserting tracking scripts into messages, text or emails. The tracking scripts may expose information that can be compared to the actual usage behaviour of the legitimate user.

System and Use

The device of the legitimate user in the method of the present invention is not limited to a specific type of device. One example of devices that could benefit from executing instructions performing the method is mobile device, such as a smart phone, a tablet computer, a smart watch, smart glasses, or a wearable device. Several devices of the user can also be connected internally, which adds a further aspect to the presently disclosed invention. In particular, if the devices are not located at the same place, or if they use different operating systems, browsers etc. the method may retrieve information from any one of the devices. Therefore, if the device of the user is associated with an additional device of the legitimate user, such as a smart phone, a tablet computer, a smart watch, smart glasses, or a wearable device, and wherein the usage information is retrieved from the additional device, the legitimate user may select not only the type of usage information to use in the comparison(s) but also from which of the devices the information should be retrieved. As an example, a user may log in from a first computer or first mobile device located at his residence. The computer or mobile device is paired to an additional device, for example a smart watch having a connection to the first device. If the user leaves the residence wearing the smart watch, but leaving the first device, an access of the online service from the first device can be considered to be unauthorized. The choice of the second device to be the device from which the usage information to be compared is retrieved can be either an automatic setting or a manual choice of the user. Similarly the user can choose other settings, including which types of information to use in the comparison, and, more specifically, which types of geographic locations to use in the comparisons.

Furthermore, it may be an advantage that the method is executed on or by the device of the legitimate user since this device may have direct access to e.g. the actual geographic location of the legitimate user.

The presently disclosed method may be implemented as a separate computer program but may also be implemented as a plugin to an existing service running on a device or online. In one embodiment the service is an email program or an email server or an online service in connection with an email server. Such an embodiment may be used as a secured email application that can, wherein emails can only be accessed by a user providing a geographical matching the geographic location of the legitimate user from a device of the legitimate user. The method may also be integrated in a network security system, such as a firewall or authorization technologies.

A computer implemented method according to the presently disclosed invention preferably repeats the steps of the methods. In relation to the repetition of the steps, a question that arises is how often the program should execute the steps of the method to identify potentially unauthorized accesses of the account. The answer is that it depends on the circumstances. Frequent execution of the steps of the method increases the possibilities to identify an unauthorized access quickly but typically implies higher power consumption and more data transfer, in particular if geographical indications by means of e.g. GPS are used. In one embodiment the steps of the method are are iteratively repeated at fixed time intervals, such as repeated every minute, every 2 minutes, every 3 minutes, every 4 minutes, every 5 minutes, every 10 minutes, every 15 minutes, every 20 minutes, every 30 minutes, every hour, every 2 hours, every 3 hours, every 4 hours, every 6 hours, every 8 hours, every 10 hours, every 15 hours, every 20 hours, or every 24 hours. Alternatively, the user may start the method manually, or the steps are iteratively repeated upon a specific event, such that a new login of the online service account occurs.

The invention further relates to a system for identifying unauthorized access of an account of an online service, comprising a non-transitive, computer-readable storage device for storing instructions that, when executed by a processor, performs a method for identifying unauthorized access of an account of an online service according to the described method. The system may comprise a mobile device comprising a processor and a memory and being adapted to perform the method but it can also by a stationary system or a system operating from a centralized location, and/or a remote system, involving e.g. cloud computing. The invention further relates to a computer program having instructions which when executed by a computing device or system cause the computing device or system to identify an unauthorized access of an account of an online service according to the described method. Computer program in this context shall be construed broadly and include e.g. programs to be run on a PC or software designed to run on smartphones, tablet computers or other mobile devices. Computer programs and mobile applications include software that is free and software that has to be bought, and also include software that is distributed over distribution software platforms such as Apple App Store, Google Play and Windows Phone Store.

Further Details of the Invention

1. A (computer implemented) method for identifying unauthorized access of an account of an online service, such as an email or a social network service, wherein the account is associated with a legitimate user, the method comprising the steps of:
   retrieving login information from recent login activity of the account;
   retrieving usage information from a device of the legitimate user;
   comparing the login information and the usage information;
   identifying potentially unauthorized login(s) by an unauthorized user.
2. The method according to any of the preceding items, wherein the login information corresponds to a geographic location associated with the ongoing or most recent login attempt.
3. The method according to any of the preceding items, wherein the usage information comprises a geographic location of a legitimate user.
4. The method according to any of the preceding items, wherein the step of comparing the login information and the usage information is performed by comparing the geographic location associated with the ongoing or most recent login attempt and the geographic location of a legitimate user.
5. The method according to any of the preceding items, wherein the most recent login attempts is a single most recent login attempt.
6. The method according to any of the preceding items, wherein the geographic location is provided manually by a potentially authorized user as part of a login attempt.
7. The method according to any of the preceding items, wherein the geographic location is provided by an application associated with the online service, such as a tracking script for an email or online service.
8. The method according to any of the preceding items, wherein the geographic location is extracted from an activity of the potentially authorized user.
9. The method according to any of the preceding items, wherein the potentially authorized user is requested to provide the geographic location corresponding to the ongoing or single most recent login attempt.
10. The method according to item 8, wherein a negative response or an absence of a response within a predefined period of time corresponds to the ongoing or single most recent login attempt being considered an unauthorized login.
11. The method according to any of the preceding items, further comprising the step of rejecting the ongoing login attempt if the ongoing login attempt is identified as an unauthorized login.
12. The method according to any of the preceding items, wherein the recent login activity comprises the last n number of login and/or login attempts, wherein n is any integer equal to or above 1, such as 1, or 2, or 3, or 4, or 5, or 6, or 7, or 8, or 9, or 10, or 20, or 30, or 40, or 50, or 100, or 200, or 500, or 1000.
13. The method according to any of the preceding items, wherein the step of retrieving login information from recent login activity comprises: gathering information about (an) access type(s) (PC browser/mobile browser/smartphone or tablet application/POP3/IMAP), and/or (a) browser(s), and/or (an) operating system(s), and/or (an) IP address(es), and/or (a) geographic location(s) (country/city/GPS coordinates), and/or date, and/or time for each of the logins and/or login attempts.
14. The method according to item 13, further comprising the step of retrieving (an) operator network(s) associated with the IP address(es) of the logins and/or login attempts.
15. The method according to any of the preceding items, wherein the login information from a recent login activity of the account or information about an application associated with the online service is retrieved from the device of the legitimate user.
16. The method according to any of the preceding items, wherein the step of retrieving usage information from a device of the legitimate user comprises: retrieving stored and logged information from a device of the legitimate user from a predefined period of time, such as 1 day, or 1 week, or 1 month, or 2 months, or 6 months, or 1 year back in time.
17. The method according to any of the preceding items, wherein the step of retrieving usage information from a device of the legitimate user comprises: retrieving information about (an) access type(s) (PC browser/mobile browser/smartphone or tablet application/POP3/IMAP), and/or (a) browser(s), and/or (an) operating system(s), and/or (an) IP address(es) corresponding to legitimate accesses of the legitimate user.
18. The method according to item 17, wherein the retrieved usage information from the device of the legitimate user comprises a number of records comprising legitimate access types, and/or browsers, and/or operating systems, and/or IP addresses.
19. The method according to any of the preceding items, wherein the step of retrieving usage information from a device of the legitimate user comprises: retrieving information about a geographic location of the legitimate user.
20. The method according to item 19, wherein the information about the geographic location of the legitimate user is retrieved from a primary device of the legitimate user.
21. The method according to any of items 19-20, wherein the geographic location corresponds to an actual location of the legitimate user provided by the primary device of the legitimate user.
22. The method according to any of items 19-21, wherein the primary device is defined by the legitimate user.
23. The method according to any of items 19-22, wherein the step of comparing the login information and the usage information comprises the step of comparing the geographic location corresponding to the ongoing or single most recent login attempt and the geographic location of the legitimate user.
24. The method according to any of items 19-23, wherein the primary device is a mobile phone, a computer, a smart watch, a wearable device.
25. The method according to any of the preceding items, wherein the step of comparing the login information and the usage information is a geographic authentication.
26. The method according to any of items 19-25, wherein the information about the geographic location of the legitimate user is provided by a global positioning system of the device, or by a Wi-Fi system of the device.
27. The method according to any of the preceding items, wherein the step of retrieving usage information from a device of the legitimate user comprises: retrieving an IP address of the device of the legitimate user.
28. The method according to item 27, further comprising the step of retrieving an operator network associated with the IP address of the device of the legitimate user.
29. The method according to any of the preceding items, wherein the step of retrieving usage information from a device of the legitimate user comprises: retrieving information about a mobile country code (MCC), and/or mobile network code (MNC), and/or location are code (LAC), and/or cell ID of a mobile network.
30. The method according to any of the preceding items, wherein the step of comparing the login information and the usage information includes: comparing the geographical location of the login information and the geographical information of the usage information.
31. The method according to any of the preceding items, wherein a geographic location corresponding to the latest login or login attempt in the recent login activity is compared with a present geographical information of the usage information.
32. The method according to any of the preceding items, wherein the geographic location corresponding to the latest login or login attempt in the recent login activity is compared with a list of geographic locations from the retrieved usage information from a device of the legitimate user.
33. The method according to any of the preceding items, wherein at least one of the geographic locations have been approved by the legitimate user, thereby creating a safe list of geographic locations.
34. The method according to any of the preceding items, wherein all of the geographic locations from the retrieved usage information have been approved by the legitimate user.
35. The method according to any of the preceding items, wherein the step of comparing the login information and the usage information includes: comparing the access type(s), and/or the browser(s), and/or the operating system(s), and/or the IP address(es), and/or the network operator(s) of the login information with the access type(s), and/or the browser(s), and/or the operating system(s), and/or the IP address(es), and/or the network operator(s) of the usage information.
36. The method according to any of the preceding items, wherein the step of identifying potentially unauthorized login(s) by an unauthorized user includes: identifying a potentially unauthorized login based on a difference in geographical location of the login information and the geographical information of the usage information.
37. The method according to item 36, wherein the method identifies a potentially unauthorized login if the difference in distance between a geographical location from the login information and a geographical location from the usage information is greater than a predefined distance, such as preferably greater than 5 m, more preferably greater than 3 m, even more preferably greater than 1 m, or greater than 10 m, or greater than 15 m, or greater than 20 m, or greater than 30 m, or greater than 40 m, or greater than 50 m, or greater than 100 m, or greater than 200 m, or greater than 300 m, or greater than 400 m, or greater than 500 m, or greater than 1 km, or greater than 2 km, or greater than 3 km, or greater than 4 km, or greater than 5 km, or greater than 10 km, or greater than 100 km, or greater than 1000 km.
38. The method according to any of the preceding items, wherein the method identifies a potentially unauthorized login if a country of the login information, such as the last registered country, is different from the present geographical information of the usage information, wherein the present geographical information of the usage information comprises a country.
39. The method according to any of the preceding items, wherein the method identifies a potentially unauthorized login if the difference between a geographical location of the login information and the geographical locations of the usage information is greater than a predefined distance, wherein the geographical location of the login information is individually compared against all geographical locations of the safe list and the present geographical information of the usage information, wherein the method identifies a potentially unauthorized login only if the difference is greater than the predefined distance for geographical locations of the safe list and the present geographical information of the usage information.

40. The method according to any of the preceding items, wherein the method identifies a potentially unauthorized login if the browser of a recent login activity is different from the browser of all of the records comprising legitimate browsers, or if the access type of a recent login activity is different from the access type of all of the records comprising legitimate access types, or if the operating system of a recent login activity is different from the operating system of all of the records comprising legitimate operating systems, or if the IP address of a recent login activity is different from the IP address of all of the records comprising legitimate IP addresses.

41. The method according to any of the preceding items, wherein the method identifies a potentially unauthorized login if a combination of the geographical locations of the recent login activity and/or information about (an) access type(s) (PC browser/mobile browser/smartphone or tablet application/POP3/IMAP), and/or (a) browser(s), and/or (an) operating system(s), and/or (an) IP address(es) is different from a corresponding combination in an element of a safe combination list.

42. The method according to item 41, wherein the elements of the safe combination list have been approved by legitimate user.

43. The method according to any of items 41-42, wherein the elements of the safe combination list further comprise time intervals associated with elements, the method further comprising the step of identifying a potentially unauthorized login if the time of the compared login and/or login attempt is outside the time interval of the compared element.

44. The method according to any of the preceding items, further comprising the step of generating a threat score based on the comparison of the login information and the usage information.

45. The method according item 44, wherein the threat score is based on the difference in a geographical location of the login information and a geographical information of the usage information.

46. The method according to any of the preceding items, further comprising the step of associating the unauthorized access to a category of intruders based on the comparison.

47. The method according to any of the preceding items, further comprising the step of generating a visual, audible and/or tangible alert if an unauthorized access is identified.

48. The method according to item 47, wherein the alert is delivered to the legitimate user as a pop-up window on the device, and/or as a notification in a mobile application and/or a computer program, and/or as an email, and/or as an SMS, and/or the alert is forward to another device, such as another mobile device, such as a mobile phone, a smart watch or a wearable device.

49. The method according to any of items 47-48, further comprising the step of asking the legitimate user to approve or reject the identified unauthorized login.

50. The method according to item 49, further comprising the step of adding the approved identified unauthorized login to the safe list or the records comprising legitimate access types, and/or browsers, and/or operating systems, and/or IP addresses.

51. The method according to any of items 49-50, further comprising the step of logging off the account if the legitimate user rejects the identified unauthorized login.

52. The method according to any of items 49-51, wherein the step of logging off the account includes logging off all users and/or sessions that are logged on to the account.

53. The method according to any of items 49-52, wherein a record keeps track of other accounts associated to the legitimate user, and wherein the step of logging off the account further comprises the step of logging off all users and/or sessions of all the other accounts associated to the legitimate user.

54. The method according to any of items 49-53, further comprising the step of suspending the account and/or changing the password and/or changing recovery data and/or updating security settings for the account.

55. The method according to item 54, further comprising the step of suspending and/or changing the password and/or changing recovery data and/or updating security settings for the other accounts associated to the legitimate user.

56. The method according to any of the preceding items, further comprising the step of retrieving alerts and/or warnings from the account of the online service.

57. The method according to any of the preceding items, further comprising the step of, prior to or after the other steps, retrieving the security settings of the account.

58. The method according to item 57, further comprising the step of evaluating the consistency of the security settings between accounts associated to the legitimate user and/or evaluating a change in the security settings in relation to a prior login.

59. The method according to any of the preceding items, wherein all the steps are iteratively repeated at fixed time intervals, such as repeated every minute, every 2 minutes, every 3 minutes, every 4 minutes, every 5 minutes, every 10 minutes, every 15 minutes, every 20 minutes, every 30 minutes, every hour, every 2 hours, every 3 hours, every 4 hours, every 6 hours, every 8 hours, every 10 hours, every 15 hours, every 20 hours, or every 24 hours.

60. The method according to any of the preceding items, wherein the method is executed on or by the device of the legitimate user.

61. The method according to any of the preceding items, wherein the online service is, or is in connection with, a firewall, network or and/or an email server.

62. The method according to any of the preceding items, wherein all the steps are iteratively repeated upon a specific event, such that a new login of the online service account occurs.

63. The method according to any of the preceding items, wherein the device is a mobile device, such as a smart phone, a tablet computer, a smart watch, smart glasses, or a wearable device.

64. The method according to any of the preceding items, wherein the device is associated with an additional device of the legitimate user, such as a smart phone, a tablet computer, a smart watch, smart glasses, or a wearable device, and wherein the usage information is retrieved from the additional device.

65. The method according to any of the preceding items, wherein the legitimate user selects which types of retrieved login information and usage information to use in the comparisons.

66. The method according to any of the preceding items, wherein the legitimate user selects which types of geographic locations to use in the comparisons.

67. A system for identifying unauthorized access of an account of an online service, comprising a non-transitive, computer-readable storage device for storing instructions that, when executed by a processor, performs a method for identifying unauthorized access of an account of an online service according to any of items 1-66.

68. A mobile device comprising a processor and a memory and being adapted to perform the method for identifying unauthorized access of an account of an online service according to any items 1-66.

69. A computer program having instructions which when executed by a computing device or system cause the computing device or system to identify an unauthorized access of an account of an online service according to any of items 1-66.

The invention claimed is:

1. A method for identifying unauthorized access of an account of an online service, wherein the account is associated with a legitimate user, the method comprising:
retrieving login information from recent login activity of the account corresponding to a geographic location associated with an ongoing or most recent login attempt, wherein the geographic location is provided manually by a potentially authorized user or extracted from an activity of the potentially authorized user;
retrieving usage information comprising a geographic location of the legitimate user from a device of the legitimate user, wherein the information about the geographic location of the legitimate user is retrieved from a primary device of the legitimate user or corresponds to an actual location of the legitimate user provided by the primary device of the legitimate user;
comparing the login information and the usage information by comparing the geographic location associated with the ongoing or most recent login attempt and the geographic location of the legitimate user; and
identifying one or more potentially unauthorized logins by an unauthorized user based on a difference in the geographical location associated with the ongoing or most recent login attempt and the geographic location of the legitimate user from the device of the legitimate user.

2. The method of claim 1, wherein the geographic location is provided by an application associated with the online service.

3. The method of claim 1, wherein the potentially authorized user is requested to provide the geographic location corresponding to the ongoing or single most recent login attempt.

4. The method of claim 3, wherein a negative response or an absence of a response within a predefined period of time corresponds to the ongoing or single most recent login attempt being considered an unauthorized login.

5. The method of claim 1, further comprising rejecting the ongoing login attempt if the ongoing login attempt is identified as an unauthorized login.

6. The method of claim 1, wherein retrieving login information from recent login activity comprises gathering information about at least one of:
one or more access types,
one or more browsers,
one or more operating systems,
one or more IP addresses,
one or more geographic locations,
a date, and
a time
for each of one or more of the logins and the login attempts.

7. The method of claim 1, wherein retrieving usage information from a device of the legitimate user comprises retrieving information about at least one of:
one or more access types, and/or
one or more browsers,
one or more operating systems, and
one or more IP addresses
corresponding to legitimate accesses of the legitimate user.

8. The method of claim 1, wherein retrieving usage information from a device of the legitimate user comprises: retrieving information about a geographic location of the legitimate user.

9. The method of claim 8, wherein comparing the login information and the usage information comprises comparing the geographic location corresponding to the ongoing or single most recent login attempt and the geographic location of the legitimate user.

10. The method of claim 1, wherein comparing the login information and the usage information is a geographic authentication.

11. The method of claim 1, wherein comparing the login information and the usage information includes: comparing the geographical location of the login information and the geographical information of the usage information.

12. The method of claim 1, wherein a potentially unauthorized login is identified if a combination of one or more of:
the geographical locations of the recent login activity, and information about one or more of:
one or more access types,
one or more browsers,
operating systems, and
IP addresses
is different from a corresponding combination in an element of a safe combination list.

13. The method of claim 1, further comprising generating one or more of a visual alert, an audible alert, and a tangible alert, or a notification if an unauthorized access is identified, wherein the alert is delivered to the legitimate user as one or more of a pop-up window on the device, a notification in a mobile application or a computer program, an email, an SMS, or the alert is forwarded to another device.

14. The method of claim 1, further comprising requesting the legitimate user to confirm the geographical location of the device for one or more login attempts.

15. The method of claim 1, further comprising counteracting an identified unauthorized access.

16. The method of claim 1, further comprising revealing information relating to the unauthorized user.

17. The method of claim 1, further comprising:
asking the legitimate user to approve or reject an identified unauthorized login, and one or more of:
logging off the account,
suspending the account, changing the password,
changing recovery data, and
updating security settings for the account
if the legitimate user rejects the identified unauthorized login.

18. The method of claim 17, wherein:
a record keeps track of other accounts associated to the legitimate user, and
logging off the account further comprises logging off all users and sessions of all the other accounts associated to the legitimate user.

19. A system for identifying unauthorized access of an account of an online service, wherein the account is associated with a legitimate user, the system comprising:
a processor; and
a non-transitory, computer-readable storage medium comprising one or more programming instructions thereon that, when executed by the processor, causes the processor to:
retrieve login information from recent login activity of the account corresponding to a geographic location associated with an ongoing or most recent login attempt, wherein the geographic location is provided manually by a potentially authorized user or extracted from an activity of the potentially authorized user;
retrieve usage information comprising a geographic location of the legitimate user from a device of the legitimate user, wherein the information about the geographic location of the legitimate user is retrieved from a primary device of the legitimate user or corresponds to an actual location of the legitimate user provided by the primary device of the legitimate user;
compare the login information and the usage information by comparing the geographic location associated with the ongoing or most recent login attempt and the geographic location of the legitimate user; and
identify one or more potentially unauthorized logins by an unauthorized user based on a difference in the geographical location associated with the ongoing or most recent login attempt and the geographic location of the legitimate user from the device of the legitimate user.

20. A non-transitory storage medium comprising a computer program product having instructions embodied thereon, the computer program product, when executed by a computing device or system, causes the computing device or system to identify an unauthorized access of an account of an online service, wherein the account is associated with a legitimate user, by completing the following:
retrieving login information from recent login activity of the account corresponding to a geographic location associated with an ongoing or most recent login attempt, wherein the geographic location is provided manually by a potentially authorized user or extracted from an activity of the potentially authorized user;
retrieving usage information comprising a geographic location of the legitimate user from a device of the legitimate user, wherein the information about the geographic location of the legitimate user is retrieved from a primary device of the legitimate user or corresponds to an actual location of the legitimate user provided by the primary device of the legitimate user;
comparing the login information and the usage information by comparing the geographic location associated with the ongoing or most recent login attempt and the geographic location of the legitimate user; and
identifying one or more potentially unauthorized logins by an unauthorized user based on a difference in the geographical location associated with the ongoing or most recent login attempt and the geographic location of the legitimate user from the device of the legitimate user.

* * * * *